(12) United States Patent
Pitaval et al.

(10) Patent No.: US 11,310,837 B2
(45) Date of Patent: Apr. 19, 2022

(54) NETWORK ACCESS NODE AND A CLIENT DEVICE FOR GENERATING AND USING RANDOMS ACCESS SEQUENCES

(71) Applicant: HUAWEI TECHNOLOGIES CO., LTD., Guangdong (CN)

(72) Inventors: Renaud-Alexandre Pitaval, Kista (SE); Branislav M. Popovic, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/950,159

(22) Filed: Nov. 17, 2020

(65) Prior Publication Data

US 2021/0076425 A1    Mar. 11, 2021

Related U.S. Application Data

(63) Continuation of application No. PCT/EP2018/063424, filed on May 23, 2018.

(51) Int. Cl.
*H04J 13/00*    (2011.01)
*H04L 27/26*    (2006.01)
(Continued)

(52) U.S. Cl.
CPC ..... *H04W 74/0833* (2013.01); *H04J 13/0062* (2013.01); *H04L 27/2607* (2013.01); *H04L 27/2613* (2013.01); *H04W 72/042* (2013.01)

(58) Field of Classification Search
CPC ... H04J 13/0062; H04J 13/14; H04L 27/2607; H04L 27/2613; H04L 27/2614; H04W 72/042; H04W 74/0833
See application file for complete search history.

(56) References Cited

FOREIGN PATENT DOCUMENTS

WO    2012145914 A1    11/2012

OTHER PUBLICATIONS

Huawei, HiSilicon, "PRACH preamble sequences foR NR," 3GPP TSG RAN WG1 Meeting #88bis, R1-1705055, Spokane, USA, Apr. 3-7, 2017, 18 pages.

(Continued)

*Primary Examiner* — Melvin C Marcelo
*Assistant Examiner* — Natali Pascual Peguero
(74) *Attorney, Agent, or Firm* — Fish & Richardson P.C.

(57) ABSTRACT

A network access node and a client device for generating and using cubic phase polynomial sequences $(s_i, s_j)$ of length L with a third order coefficient value $a_3$ belonging to the subset of sequences $(\mathcal{S}_k)$ are described. The network access node transmits a control message to the client device, wherein the control message indicates the cyclical shift value $N_{CS}$ and the third order coefficient value $a_3$. The client device receives the control message and determines a cubic polynomial phase sequence $(s_i)$ belonging to the subset of sequences $(\mathcal{S}_k)$ based on the cyclical shift value $N_{CS}$ and the third order coefficient value $a_3$. The client device thereafter transmits the determined cubic polynomial phase sequence $(s_i)$ as a random access preamble to the network access node.

20 Claims, 4 Drawing Sheets

(51) Int. Cl.
    *H04W 72/04*     (2009.01)
    *H04W 74/08*     (2009.01)

(56)     References Cited

OTHER PUBLICATIONS

Huawei, HiSilicon, "RACH preamble design for NR," 3GPP TSG RAN WG1 Meeting #88, R1-1701709, Athens, Greece, Feb. 13-17, 2017, 16 pages.

Panasonic, NTT DoCoMo, "RACH sequence allocation and indication to the cell," 3GPP TSG RAN WG1 Meeting #50, R1-073836, Athens, Greece, Aug. 20-24, 2007, 10 pages.

PCT International Search Report and Written Opinion issued in International Application No. PCT/EP2018/063424 dated Feb. 26, 2019, 12 pages.

Pitaval et al., "Overcoming 5G PRACH Capacity Shortfall by Combining Zadoff-Chu and M-Sequences," 2018 IEEE International Conference on Communications (ICC), Jul. 31, 2018, 6 pages.

Popovic, "Quasi-orthogonal supersets," 2011 IEEE Information Theory Workshop, Dec. 1, 2011, 5 pages.

Strohmer et al., "Grassmannian frames with applications to coding and communication," Applied and Computational Harmonic Analysis, vol. 4, Issue 3, May 2003, 19 pages.

NETWORK ACCESS NODE AND A CLIENT DEVICE FOR GENERATING AND USING RANDOMS ACCESS SEQUENCES

CROSS-REFERENCE TO RELATED APPLICATIONS

This application is a continuation of International Application No. PCT/EP2018/063424, filed on May 23, 2018, the disclosure of which is hereby incorporated by reference in its entirety.

TECHNICAL FIELD

The application relates to a network access node and a client device for generating and using random access sequences. Furthermore, the application also relates to corresponding methods and a computer program.

BACKGROUND

In cellular networks, such as LTE and NR, the physical random access channel (PRACH) conveys uplink (UL) synchronization signals in order to establish an initial access from a user equipment (UE) to a base station (BS). The cellular network should support multiple PRACH signals, called preambles, to enable simultaneous detection of multiple UEs accessing the network in a random access procedure. In order for the BS to correctly detect multiple preambles as well as estimating their timing for synchronization, the preambles should have low out-of-phase auto-correlation and low cross-correlations. It is also desirable that the PRACH signals have low peak-to-average power ratio (PAPR) as typically required for UL signals.

In 3GPP LTE systems, the preambles are constructed from Zadoff-Chu (ZC) sequences with different cyclic shifts and root indexes, interpolated and transmitted by discrete Fourier transform spread orthogonal frequency division multiplexing (DFT-s-OFDM) with a cyclic prefix (CP). The cyclic-prefix allows receiver detection via periodic correlation of the received signal with a bank of candidate preambles. LTE PRACH includes four preambles formats with sequence length $N_{ZC}=839$ with a subcarrier spacing (SCS) of $\Delta f_{RA}=1.25$ kHz. An additional format, used only in time-division duplexing (TDD) small cell, was late introduced based on $L=139$ and $\Delta f_{RA}=7.5$ kHz.

SUMMARY

An objective of embodiments of the application is to provide a solution which mitigates or solves the drawbacks and problems of conventional solutions.

The above and further objectives are solved by the subject matter of the independent claims. Further advantageous embodiments of the application can be found in the dependent claims.

According to a first aspect of the application, the above mentioned and other objectives are achieved with a network access node for a wireless communication system, the network access node being configured to
generate a subset of sequences belonging to a set of sequences,
wherein the subset of sequences comprises a plurality of cubic phase polynomial sequences of length L with a third order coefficient value $a_3$,
wherein an auto-correlation for a sequence in the generated subset of sequences with a cyclically shifted version of itself is less than or equal to $\sqrt{L}$ when the cyclically shifted version is cyclically shifted less than a cyclical shift value $N_{CS}$,
wherein a cross-correlation between a first sequence and a second sequence in the generated subset of sequences is less than or equal to $\sqrt{L}$, and
wherein a cross-correlation between the first sequence and the second sequence in the generated subset of sequences is less than or equal to $\sqrt{L}$ when one of the first sequence and
the second sequence is cyclically shifted less than the cyclical shift value $N_{CS}$; and transmit a control message to a client device, wherein the control message indicates the cyclical shift value $N_{CS}$ and the third order coefficient value $a_3$.

It is herein understood that the first sequence and the second sequence both belongs to the generated subset of sequences which comprises the plurality of cubic phase polynomial sequences. Hence, each of the first sequence and the second sequence has sequence length L and the third order coefficient value $a_3$.

It is further understood that the cross-correlation between the first sequence and the second sequence is less than or equal to $\sqrt{L}$ also when no one of the first sequence and the second sequence are cyclically shifted.

In order to enable new use cases, such as low-latency, millimeter-wave (mmWave), and high-speed transmissions, the ongoing 3GPP 5G NR standardization recently introduced several new preamble formats constructed from larger subcarrier spacing (i.e. $\Delta f_{RA}=15$, 30, 60, 120 kHz) and the short sequence length of $L=139$. Unfortunately, the combination of such large SCS with a short sequence reduces drastically the number of ZC sequences that can be constructed to support PRACH in the network, to a level that 5G NR may face a PRACH capacity shortfall. An advantage of the network access node according to the first aspect is to increase the number of available sequences for random access in cells without increasing interference.

In an implementation form of a network access node according to the first aspect, a cross-correlation between two sequences belonging to two different subsets of sequences is less than or equal to $2\sqrt{L}$.

An advantage with this implementation form is to increase further the number of available sequences for random access in cells with a minimum increase of intra-cell interference.

In an implementation form of a network access node according to the first aspect, third order coefficients of sequences belonging to different subsets of sequences are different.

An advantage with this implementation form is that it provides a convenient partitioning of sequences such that sequences from two different subsets have a maximum cross-correlation over all possible cyclic shifts greater than $\sqrt{L}$ and less than or equal to $2\sqrt{L}$. Therefore, the intra-cell correlation, and hence intra-cell interference, is not increased if sequences from different subsets are allocated to different cells.

In an implementation form of a network access node according to the first aspect, each sequence belonging to the set of sequences has a non-zero third order coefficient value $a_3$.

An advantage with this implementation form is that with non-zero third order coefficient value $a_3$ new sequences can be generated in addition to Zadoff-Chu sequences as currently used in LTE and NR.

In an implementation form of a network access node according to the first aspect, wherein generate the subset of sequences comprises element-by-element multiplication of a Zadoff-Chu sequence with an Alltop sequence.

In an implementation form of a network access node according to the first aspect, wherein generate the subset of sequences comprises element-by-element multiplication of the Zadoff-Chu sequence cyclically shifted by a multiple of the cyclical shift value $N_{CS}$ with any cyclically-shifted version of the Alltop sequence.

An advantage with this implementation form is that it offers the largest possible set of new sequences constructed by covering ZCZ-ZC (zero-correlation zone Zadoff-Chu) which are defined in NR standardization.

In an implementation form of a network access node according to the first aspect, wherein generate the subset of sequences comprises element-by-element multiplication of any cyclically shifted version of the Zadoff-Chu sequence with the Alltop sequence cyclically shifted by a multiple of the cyclical shift value $N_{CS}$.

An advantage with this implementation form is that all sequences in the subset are kept orthogonal in the case of no delay uncertainty. This may provide improved detection if a delay uncertainty is non-uniformly distributed in the low-correlation zone (LCZ) with a probability pick for zero delay.

In an implementation form of a network access node according to the first aspect, a second order coefficient value $a_2$ is a product of the third order coefficient value $a_3$ times the cyclical shift value $N_{CS}$.

In an implementation form of a network access node according to the first aspect, wherein the generated subset of sequences is associated with a cell served by the network access node according to a random access procedure.

An advantage with this implementation form is that is to increase the number of available sequences for random access in cells without increasing inter-cell interference, and with a minimum increase of intra-cell interference.

In an implementation form of a network access node according to the first aspect, wherein the cyclical shift value $N_{CS}$ is larger than zero and less than or equal to L.

According to a second aspect of the application, the above mentioned and other objectives are achieved with a client device for a wireless communication system, the client device being configured to receive a control message from a network access node, wherein the control message indicates a cyclical shift value $N_{CS}$ and a third order coefficient value $a_3$ of a subset of sequences;

determine a cubic polynomial phase sequence belonging to the subset of sequences based on the cyclical shift value $N_{CS}$ and the third order coefficient value $a_3$;

transmit the determined cubic polynomial phase sequence as a random access preamble to the network access node.

An advantage of the client device is that the client device is able randomly pick a sequence among a subset of sequences as indicated by the network node in the control message.

In an implementation form of a client device according to the second aspect, wherein determine the cubic polynomial phase sequence comprises determine a first order coefficient value $a_1$ based on the third order coefficient value $a_3$ and the cyclical shift value $N_{CS}$ and a second order coefficient value $a_2$ based on the third order coefficient value $a_3$.

An advantage with this implementation form is that the client device is able to construct multiple non-trivial subset of sequences with desired correlation properties only based on the received third order coefficient value $a_3$ and cyclical shift value $N_{CS}$.

In an implementation form of a client device according to the second aspect, wherein determine the cubic polynomial phase sequence comprises determine a first order coefficient value $a_1$ as an arbitrary value and a second order coefficient value $a_2$ based on the third order coefficient value $a_3$ and the cyclical shift value $N_{CS}$.

An advantage with this implementation form is that the client device is able to construct multiple non-trivial subsets of sequences with desired correlation properties only based on the received third order coefficient value $a_3$ and cyclical shift value $N_{CS}$.

In an implementation form of a client device according to the second aspect, the subset of sequences is a subset belonging to a set of sequences, wherein the subset of sequences comprises a plurality of cubic phase polynomial sequences of length L with a third order coefficient value $a_3$, wherein an auto-correlation for a sequence in the generated subset of sequences $S_k$ with a cyclically shifted version of itself is less than or equal to $\sqrt{L}$ when the cyclically shifted version is cyclically shifted less than a cyclical shift value $N_{CS}$, wherein a cross-correlation between a first sequence and a second sequence in the generated. subset of sequences is less than or equal to $\sqrt{L}$, and wherein a cross-correlation between the first sequence and the second sequence in the generated subset of sequences is less than or equal to $\sqrt{L}$ when one of the first sequence and the second sequence is cyclically shifted less than the cyclical shift value $N_{CS}$.

An advantage with this implementation form is to increase the number of available sequences for random access in cells without increasing interference.

In an implementation form of a client device according to the second aspect, the cyclical shift value $N_{CS}$ is larger than zero and less than L.

According to a third aspect of the application, the above mentioned and other objectives are achieved with a method for a network access node, the method comprises generating a subset of sequences belonging to a set of sequences, wherein the subset of sequences comprises a plurality of cubic phase polynomial sequences of length L with a third order coefficient value $a_3$, wherein an auto-correlation for a sequence in the generated subset of sequences with a cyclically shifted version of itself is less than or equal to $\sqrt{L}$ when the cyclically shifted version is cyclically shifted less than a cyclical shift value $N_{CS}$, wherein a cross-correlation between a first sequence ($s_i$) and a second sequence in the generated subset of sequences is less than or equal to $\sqrt{L}$, and wherein a cross-correlation between the first sequence and the second sequence in the generated subset of sequences is less than or equal to $\sqrt{L}$ when one of the first sequence and the second sequence is cyclically shifted less than the cyclical shift value $N_{CS}$; and transmitting a control message to a client device, wherein the control message indicates the cyclical shift value $N_{CS}$ and the third order coefficient value $a_3$.

The method according to the third aspect can be extended into implementation forms corresponding to the implementation forms of the network access node according to the first aspect. Hence, an implementation form of the method comprises the feature(s) of the corresponding implementation form of the network access node.

The advantages of the methods according to the third aspect are the same as those for the corresponding implementation forms of the network access node according to the first aspect.

According to a fourth aspect of the application, the above mentioned and other objectives are achieved with a method for a client device, the method comprises receiving a control message from a network access node, wherein the control message indicates a cyclical shift value $N_{CS}$ and a third order coefficient value $a_3$ of a subset of sequences;

determining a cubic polynomial phase sequence belonging to the subset of sequences based on the cyclical shift value $N_{CS}$ and the third order coefficient value $a_3$;

transmitting the determined cubic polynomial phase sequence as a random access preamble to the network access node.

The method according to the fourth aspect can be extended into implementation forms corresponding to the implementation forms of the client device according to the second aspect. Hence, an implementation form of the method comprises the feature(s) of the corresponding implementation form of the client device.

The advantages of the methods according to the fourth aspect are the same as those for the corresponding implementation forms of the client device according to the second aspect.

The application also relates to a computer program, characterized in program code, which when run by at least one processor causes said at least one processor to execute any method according to embodiments of the application. Further, the application also relates to a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

Further applications and advantages of the embodiments of the application will be apparent from the following detailed description.

BRIEF DESCRIPTION OF THE DRAWINGS

The appended drawings are intended to clarify and explain different embodiments of the application, in which.

DETAILED DESCRIPTION

As explained previously, 5G will support new use cases, such as low-latency, millimeter-wave (mmWave), and high-speed transmissions, which requires new synchronization signals. This requires a shorter PRACH sequence with larger SCS and bandwidth than what is required in LTE. Unfortunately, this may lead to a preamble capacity shortfall with ZC sequences. With $N_{CS}=1$ and L prime, the collection of ZC sequences forms a set of (L−1) subsets of L orthogonal vectors with maximum inner product equal to $\sqrt{L}$. A set of L orthogonal vectors provides a vector basis of the vector space $\mathbb{C}^L$. Two bases whose vectors have pairwise absolute inner product equal to $\sqrt{L}$ are known as mutually unbiased bases (MUBs). One cannot construct more than (L+1) MUBs in $\mathbb{C}^L$ which means that ZC sequence set gives almost the maximum number of sequences with such correlation properties. Consequently, to obtain a larger set than the set of LTE PRACH sequences, one will inevitably have to increase the maximum cross-correlation which nevertheless should be kept as small as possible to minimize interference and collision. Therefore, embodiments of the application relate to a network access node 100 and a client device 300 which solves or mitigates the aforementioned drawbacks.

Figure 1:
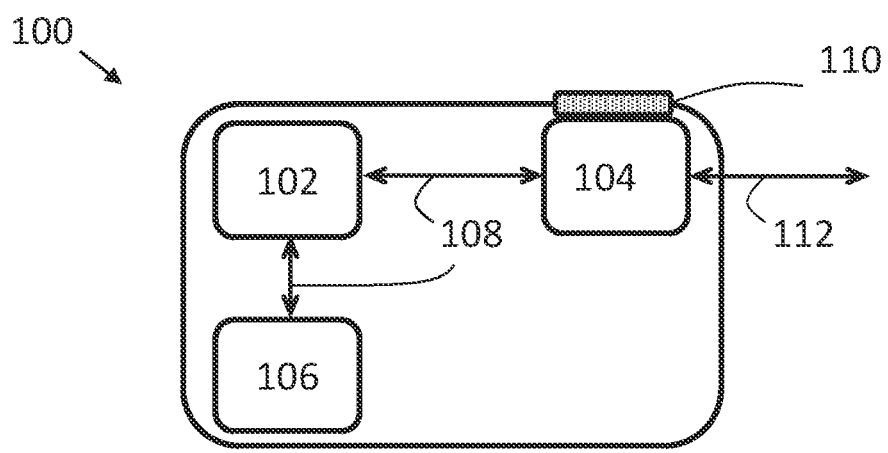
FIG. 1 shows a network access node according to an example of the application.

FIG. 1 shows a network access node 100 according to an embodiment of the application. In the embodiment shown in FIG. 1, the network access node 100 comprises a processor 102, a transceiver 104 and a memory 106. The processor 102 is coupled to the transceiver 104 and the memory 106 by communication means 108 known in the art. The network access node 100 may be configured for both wireless and wired communications in wireless and wired communication systems, respectively. The wireless communication capability is provided with an antenna 110 coupled to the transceiver 104, while the wired communication capability is provided with a wired communication interface 112 coupled to the transceiver 104. The network access node 100 further comprises an antenna 110 coupled to the transceiver 104, which means that the network access node 100 is configured for wireless communications in a wireless communication system. That the network access node 100 is configured to perform certain actions should in this disclosure be understood to mean that the network access node 100 comprises suitable means, such as e.g. the processor 102 and the transceiver 104, configured to perform said actions.

Figure 5:
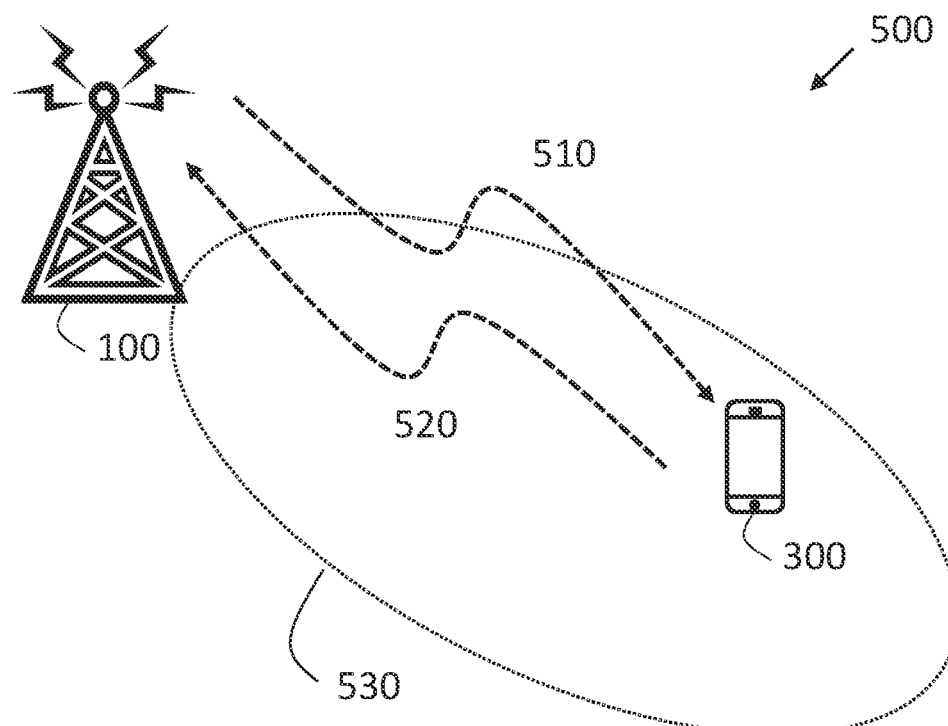
FIG. 5 shows a wireless communication system according to an example of the application.

With reference to FIGS. 1 and 5, the network access node 100 is configured to generate a subset of sequences $\mathcal{S}_k$ belonging to a set of sequences $\mathcal{S}$. The following conditions holds for sequences in the generated subset of sequences $\mathcal{S}_k$:

the subset of sequences $\mathcal{S}_k$ comprises a plurality of cubic phase polynomial sequences $s_i$, $s_j$ of length L with a third order coefficient value $a_3$, an auto-correlation for a sequence $s_i$ in the generated subset of sequences with a cyclically shifted version of itself $s'_i$ is less than or equal to $\sqrt{L}$ when the cyclically shifted version $s'_i$ is cyclically shifted less than a cyclical shift value $N_{CS}$, a cross-correlation between a first sequence $s_i$ and a second sequence $s_j$ in the generated subset of sequences $\mathcal{S}_k$ is less than or equal to $\sqrt{L}$, and a cross-correlation between the first sequence $s_i$ and the second sequence $s_j$ in the generated subset of sequences $\mathcal{S}_k$ is less than or equal to $\sqrt{L}$ when one of the first sequence $s_i$ and the second sequence $s_j$ is cyclically shifted less than the cyclical shift value $N_{CS}$.

The network access node 100 is further configured to transmit a control message 510 to a client device 300, and the control message 510 indicates the cyclical shift value $N_{CS}$ and the third order coefficient value $a_3$.

Figure 2:
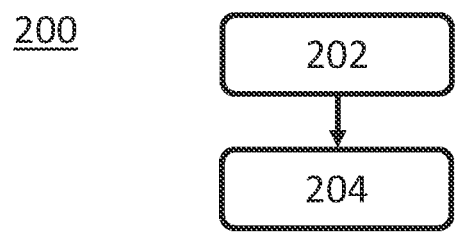
FIG. 2 shows a method according to an example of the application.

FIG. 2 shows a flow chart of a corresponding method 200 which may be executed in a network access node 100, such as the one shown in FIG. 1. The method 200 comprises the step of generating 202 a subset of sequences $\mathcal{S}_k$ belonging to a set of sequences $\mathcal{S}$. As previously stated the following conditions holds for the sequences in the generated subset of sequences $\mathcal{S}_k$:

the subset of sequences $\mathcal{S}_k$ comprises a plurality of cubic phase polynomial sequences $s_i$, $s_j$ of length L with a third order coefficient value $a_3$, an auto-correlation for a sequence $s_i$ in the generated subset of sequences with a cyclically shifted version of itself $s'_i$ is less than or equal to $\sqrt{L}$ when the cyclically shifted version $s'_i$ is cyclically shifted less than a cyclical shift value $N_{CS}$, a cross-correlation between a first sequence $s_i$ and a second sequence $s_j$ in the generated subset of sequences $\mathcal{S}_k$ is less than or equal to $\sqrt{L}$, and a cross-correlation between the first sequence $s_i$ and the second sequence $s_j$ in the generated subset of sequences $\mathcal{S}_k$ is less than or equal to $\sqrt{L}$ when one of the first sequence $s_i$ and the second sequence $s_j$ is cyclically shifted less than the cyclical shift value $N_{CS}$.

The method 200 further comprises the step 204 of transmitting a control message 510 to a client device 300, wherein the control message 510 indicates the cyclical shift value $N_{CS}$ and the third order coefficient value $a_3$.

Therefore, embodiments of the application provide, among other things, a solution to construct/generate a set of PRACH sequences $\mathcal{S} = \cup_k \mathcal{S}_k$ made of several subsets $\mathcal{S}_k$ of cubic polynomial phase sequences of length L. In other words, the following properties holds (mathematical definitions and interference measures disclosed herein are defined and explained in the later part of the present disclosure):

each subset of sequences $\mathcal{S}_k$ satisfies the low correlation zone (LCZ) condition: $\Omega(\mathcal{S}_k; N_{CS}) \le \sqrt{L}$, i.e.

a for any sequence $s_i[n] \in \mathcal{S}_k$, its out-of-phase auto-correlation with a cyclically shifted version of itself $s'_i[n]=s_i[(n+\tau) \bmod L]$ where $-N_{CS}<\tau<N_{CS}$ with $\tau \ne 0$ is less than or equal to $\sqrt{L}$: $|\theta_{s_i,s'_i}[0]|=|\theta_{s_i,s_i}[\tau]| \le \sqrt{L}$.

for any first sequence $s_i[n] \in \mathcal{S}_k$ and any second sequence $s_j[n] \in \mathcal{S}_k$ with $i \ne j$, their cross-correlation when one of them is cyclically shifted by any $-N_{CS}<\tau<N_{CS}$ is less than or equal to $\sqrt{L}$: $|\theta_{s_i,s_j}[\tau]| \le \sqrt{L}$.

the cross-set correlation among different subsets is $\Omega_{XS}(\mathcal{S}_k, \mathcal{S}_j) \le 2\sqrt{L}$, i.e. for any $s_i[n] \in \mathcal{S}_k$ and $s_j[n] \in \mathcal{S}_l$ with $k \ne l$, their cross-correlation when one of them is cyclically shifted by any $\tau$ is less than or equal to $2\sqrt{L}$: $|\theta_{s_i,s_j}[\tau]| \le 2\sqrt{L}$. In other words a cross-correlation between two sequences belonging to two different subsets of sequences is less than or equal to $2\sqrt{L}$.

The construction can include, as a subset of sequences the set of zero-correlation zone Zadoff-Chu (ZCZ-ZC) sequences from all roots so that the two properties above are still satisfied. We therefore obtain larger subsets of sequences with a similar LCZ than the full set of ZC sequences with multiple roots, and thus enable a similar detection and timing estimation accuracy. Each subset of sequences can be uniquely allocated to a cell in order to minimize the intra-cell interference. Moreover, the cross-subset correlation is limited to be twice the intra-subset correlation, and so several cells can be supported in the wireless communication system 500 with limited inter-cell interference.

Moreover, some further points in respect of the generated subset of sequences can be noted. In one case, the third order coefficients of sequences belonging to different subsets of sequences $\mathcal{S}_k$ are different. For example, a third order coefficient of a sequence belonging to a first subset of sequences $\mathcal{S}_1$ is different from a third order coefficient of a sequence belonging to a second subset of sequences $\mathcal{S}_2$ which is different from the first subset of sequences $\mathcal{S}_1$. Further, each sequence belonging to the set of sequences $\mathcal{S}$ and not belonging to the subset of ZCZ-ZC sequence has a non-zero third order coefficient value $a_3$. It can also be noted that the cyclical shift value $N_{CS}$ is larger than zero and less than L.

Hence, embodiments of the application provide the generation or construction of a set $\mathcal{S} = \cup_k \mathcal{S}_k$ made of several subsets $\mathcal{S}_k$ of cubic polynomial phase sequences all of length L, i.e. all sequences belonging to the set $\mathcal{S}$ are of the form $$p_{a_1,a_2,a_3}[n] = e^{-j2\pi \frac{a_3 n^3 + a_2 n^2 + a_1 n}{L}} \quad 0 \le n \le L-1.$$

From the Carlitz-Uchiyama bound, it can be shown that the property $\Omega_{XS}(\mathcal{S}_k, \mathcal{S}_j) \le 2\sqrt{L}$ is satisfied if the value of the third-degree coefficient $a_3$ is fixed and different in each subset of sequences. Thus for a given subset with a fixed third-degree coefficient $a_3$, the phase difference between two sequences $p_{a_1,a_2,a_3}[n+\tau]$ and $p_{a'_1,a'_2,a'_3}[n]$ is always a polynomial of the form $(3a_3\tau+a_2-a'_2)n^2+\tau(3a_3\tau^2+2a_2\tau+a_1-a'_1)n$. From the Carlitz-Uchiyama bound, the property $\Omega(\mathcal{S}_k; N_{CS}) \le \sqrt{L}$ is also satisfied if the $2^{nd}$ degree coefficient difference $(3a_3\tau+a_2-a'_2) \ne 0$ or $1^{st}$ degree coefficient difference $\tau(3a_3\tau^2+2a_2\tau+a_1-a'_1) \ne 0$ are not both simultaneously zero for any $-N_{CS}<\tau<N_{CS}$.

In embodiments of the application generating the subset of sequences $\mathcal{S}_k$ comprises element-by-element multiplication of a Zadoff-Chu sequence with an Alltop sequence. There are two different embodiments to achieve this.

In a first embodiment of generating the subset of sequences $\mathcal{S}_k$ comprises element-by-element multiplication of a Zadoff-Chu sequence cyclically shifted by a multiple of the cyclical shift value $N_{CS}$ with any cyclically-shifted version of an Alltop sequence. In other words, the subset of sequences $\mathcal{S}_k$ is generated by element-by-element multiplication of the Zadoff-Chu sequence cyclically shifted by a multiple of the cyclical shift value $N_{CS}$ with any cyclically-shifted version of the Alltop sequence. Thereby, the largest possible set is obtained by element-by-element multiplication of the ZCZ-ZC sequences with a set of cover sequences which are characterized as follows The cover sequences are defined as all power and cyclically-shifted versions of a single Alltop sequence.

The cover sequences are applied to a single orthogonal subset of ZCZ sequences obtained as cyclic shifts of a ZC sequence.

Consider the sequences defined as $$y_{l,w,\lambda,u,v}[n] = (g_{w,\lambda}[n])^l \cdot x_{u,v}[n],$$

$$0 \leq n \leq L-1, = e^{-2j\pi \frac{l(n+w)^3 + l\lambda n}{L}} \cdot x_u[n + C_v],$$

with $0 \leq l$, $w$, $\lambda$, $u \leq L-1$ and $0 \leq v \leq N_{SPR}-1$, and where $g_{w,\lambda}[n]$ and $x_{u,v}[n]$ are cyclic-shifted Alltop and ZC sequences defined in equations (3) and (2), respectively, which can be found in the end of the present disclosure. Recall that $C_v = v N_{CS}$ and $N_{SPR} = \lfloor L/N_{CS} \rfloor$. From this sequence definition, we generate the following set construction $$y_{N_{CS}} = \bigcup_{l=0}^{L-1} y_{l,N_{CS}}$$

Where for the subset l=0 it is the full set of ZCZ-ZC sequences $$Y_{0,N_{CS}} = \{\{y_{0,w,\lambda,u,v}[n]\}_{v=0}^{N_{SPR}-1}\}_{u=1}^{L-1} = Z_{N_{CS}},$$

and for any other subset index $1 \leq l \leq L-1$ $$Y_{l,N_{CS}} = \{\{y_{l,w,\lambda_l,u_l,v}[n]\}_{v=0}^{N_{SPR}-1}\}_{w=0}^{L-1}$$

such that the ZC root is any $1 \leq u_l \leq L-1$ and $0 \leq \lambda_l \leq L-1$ but fixed for a given l.

We then obtain a collection of L subsets with the following properties:

For each subset $Y_{l,N_{CS}}$ we have $$\Omega(Y_{l,N_{CS}}; N_{CS}) \leq \sqrt{L},$$

For any two subsets $Y_{l,N_{CS}}$, $Y_{l',N_{CS}}$ with $l \neq l'$ we have $$\Omega_{XS}(Y_{l,N_{CS}}, Y_{l',N_{CS}}) \leq 2\sqrt{L}.$$

The subsets are of size $|Y_{l,N_{CS}}| = L \times \lfloor L/N_{CS} \rfloor$ except for the first subset which is made of ZC sequences and for which $|Y_{0,N_{CS}}| = (L-1) \times \lfloor L/N_{CS} \rfloor$. The set $Y_{N_{CS}}$ is thus of any size $|Y_{N_{CS}}| = (L-1) \times (L+1) \times \lfloor L/N_{CS} \rfloor$ with $\Omega(Y_{N_{CS}}; N_{CS}) \leq 2\sqrt{L}$.

For a given l and all possible w and v, we obtain a subset of sequences with a LCZ of size $N_{CS}$ (i.e. same correlation as for ZC sequences with different roots). Such subset can be used as cell-specific sequences for unambiguous detection in a $N_{CS}$ delay zone. Sequences with different l that can be used in different cell.

In the above generation, not only changing the cover from conventional solution is important but also fixing the root in the ZC sequence for a given 3rd-degree coefficient. In the proposed construction, the index l increment all the degree coefficients of the polynomial phase, the index w increments the 1st- and 2nd-degree coefficients, the index v increment only the 1st-degree. For two sequences from the same index l and different index w, their inner product reduces to a Fourier transform of a ZC sequences whose absolute value is $\sqrt{L}$.

If instead one will use $$e^{-j2\pi l \frac{n^3}{L}}$$

as a cover, the 2nd-degree coefficient in the polynomial phase could only be incremented from the root of the ZC sequence, however by doing so we create ambiguity in the desired LCZ. When using $$e^{-2j\pi \frac{l(n+w)^3}{L}}$$

while at the same time fixing the root u in the ZC sequence, the 2nd-degree coefficient is then only controlled by the parameter w. A similar observation follows on fixing the 1st-degree coefficient $\lambda$ in the Alltop cover.

In a second embodiment of generating the subset of sequences $S_k$ comprises element-by-element multiplication of any cyclically shifted version of the Zadoff-Chu sequence with the Alltop sequence cyclically shifted by a multiple of the cyclical shift value $N_{CS}$. In other words, the subset of sequences $S_k$ is instead generated by element-by-element multiplication of any cyclically shifted version of the Zadoff-Chu sequence with the Alltop sequence cyclically shifted by a multiple of the cyclical shift value $N_{CS}$. By multiplying all possible cyclically shifts of a single-root ZC sequence with a power of a Alltop sequence which is then shifted with a constant gap the subset of sequences is generated. For a given power, a subset of Alltop cover shifted with a constant gap satisfied the desired LCZ.

These sequences are defined as $$\tilde{y}_{l,w,\lambda,u,v}[n] = (g_{C_w,\lambda}[n])^l \cdot x_u[n+v] = e^{-2j\pi \frac{l(n+C_w)^3 + l\lambda n}{L}} \cdot x_u[n+v],$$

$$0 \leq n \leq L-1,$$

with $0 \leq l$, $w$, $\lambda$, $u \leq L-1$, $0 \leq v \leq N_{SPR}-1$. Again, $C_w = w N_{CS}$ and $N_{SPR} \lfloor L/N_{CS} \rfloor$. We generate the set $$\tilde{y}_{N_{CS}} = \bigcup_{l=0}^{L-1} \tilde{y}_{l,N_{CS}}$$

where the subset $\tilde{Y}_{0,N_{CS}} = Z_{N_{CS}}$ is the original set of ZC sequences, and for $1 \leq l \leq L-1$ the other subsets are $$\tilde{Y}_{l,N_{CS}} = \{\{\tilde{y}_{l,w,\lambda_l,u_l,v}[n]\}_{w=0}^{L-1}\}_{v=0}^{N_{SPR}-1}$$

such that $1 \leq u_l \leq L-1$ and $0 \leq \lambda_l \leq L-1$ but fixed for a given l.

This embodiment fulfils the same correlation bounds and the same subsets/set size as in in the first embodiment. Namely, we have $\Omega(\tilde{Y}_{l,N_{CS}}; N_{CS}) \leq \sqrt{L}$, and for any two sets $Y_{l,N_{CS}}, Y_{l',N_{CS}}$ with $l \neq l'$ we have $\Omega_{XS}(\tilde{Y}_{l,N_{CS}}, \tilde{Y}_{l',N_{CS}}) \leq 2\sqrt{L}$. The subsets are of size $|\tilde{Y}_{0,N_{CS}}| = (L-1) \times \lfloor L/N_{CS} \rfloor$ except for the first subset which is made of ZC sequences and for which $|\tilde{Y}_{0,N_{CS}}| = (L-1) \times \lfloor N/L_{CS} \rfloor$.

However, the constructed sets in these two embodiments are not exactly equivalent as the pair-wise cross-correlation functions have different nulls.

The subsets for $1 \leq l \leq L-1$ can also be equivalently defined as $$\tilde{Y}_{l,N_{CS}} = \{\{\tilde{y}_{l,w,\lambda,u_l,v_l}[n]\}_{\lambda=0}^{L-1}\}_{w=0}^{N_{SPR}-1}$$

such that $0 \leq u_l$, $v_l \leq L-1$ but fixed for a given l. As such the $1^{st}$-degree coefficient is incremented in the Alltop sequence and not in the ZC sequence. In this case the ZC sequence is common to all sequences in a subset and do not play any role in the correlation properties of this subset. An interesting special case is then provided by $$\tilde{y}_{l,w,\lambda,0,0}[n] = (g_{C_w,\lambda}[n])^l = e^{-2j\pi \frac{l(n+C_w)^3 + l\lambda n}{L}},$$

which corresponds to add a $3^{rd}$-degree coefficient 1 and cyclic-shifting the Alltop sequences with a constant gap. It is noted that this last sequence definition does not allow defining ZC sequences from the same construction, In a further embodiment of the application a second order coefficient value $a_2$ of a cubic phase polynomial is a product of the third order coefficient value $a_3$ times the cyclical shift value $N_{CS}$. According to this embodiment, to avoid a sequence ambiguity among different third degree polynomial phase sequences in the desired delay zone is to directly sample the second order coefficient value $a_2$ in a polynomial enumeration. As such the second order coefficient value $a_2$ in the phase difference of two sequences in the same subset is never zero. The cubic polynomial phase sequences are defined as $$\tilde{p}_{a_1,v_{a_3},a_3}[n] = e^{-j2\pi \frac{a_3 n^3 + C_{v_{a_3}} n^2 + a_1 n}{L}}, 0 \leq n \leq L-1$$

where $$C_1 = (3a_3 N_{CS}) v_{a_3} \text{ with } 0 \leq v_{a_3} \leq \left\lfloor \frac{L}{3a_3 N_{CS}} \right\rfloor - 1.$$

This produces a collection of L−1 subsets $\wp_{N_{CS}} = \cup_{a_3=1}^{L-1} \wp_{a_3,N_{CS}}$ with $$\wp_{a_3,N_{CS}} = \left\{ \{\tilde{p}_{a_1,v_{a_3},a_3}[n]\}_{a_1=0}^{L-1} \right\}_{v_{a_3}=0}^{\lfloor \frac{L}{3a_3 N_{CS}} \rfloor - 1}$$

such that $\Omega(\wp_{a_3,N_{CS}}, N_{CS}) \leq \sqrt{L}$ for any $0 < a_3 \leq L-1$; and $\Omega_{XS}(\wp_{a_3,N_{CS}}, \wp_{a'_3,N_{CS}}) \leq 2\sqrt{L}$ for any $0 < a_3, a'_3 \leq L-1$. However, this construction has smaller number of sequences and subsets have different sizes which are given by $$|\wp_{a_3,N_{CS}}| = L \left\lfloor \frac{L}{3a_3 N_{CS}} \right\rfloor.$$

Figure 3:
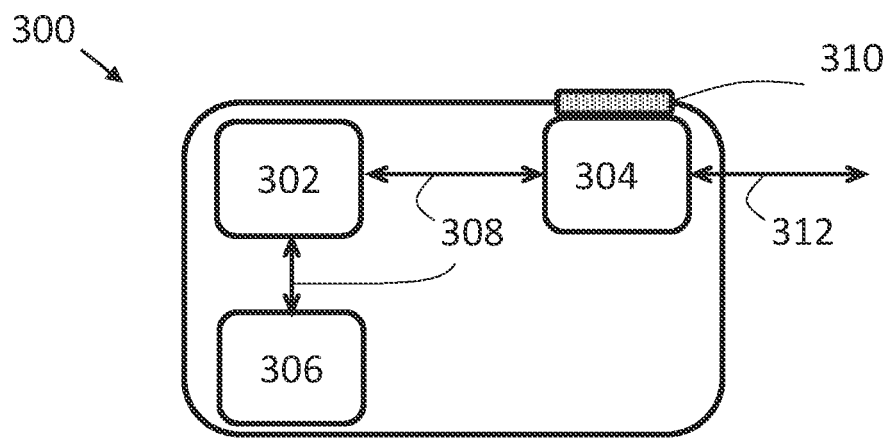
FIG. 3 shows a client device according to an example of the application.

FIG. 3 shows a client device 300 according to an embodiment of the application. In the embodiment shown in FIG. 3, the client device 300 comprises a processor 302, a transceiver 304 and a memory 306. The processor 302 is coupled to the transceiver 304 and the memory 306 by communication means 308 known in the art. The client device 300 further comprises an antenna 310 coupled to the transceiver 304, which means that the client device 300 is configured for wireless communications in a wireless communication system. That the client device 300 is configured to perform certain actions should in this disclosure be understood to mean that the client device 300 comprises suitable means, such as e.g. the processor 302 and the transceiver 304, configured to perform said actions.

With reference to FIGS. 3 and 5, the client device 300 is configured to receive a control message 510 from a network access node 100. The control message 510 indicates a cyclical shift value $N_{CS}$ and a third order coefficient value $a_3$ of a subset of sequences $S_k$. The client device 300 is further configured to determine a cubic polynomial phase sequence $s_i$ belonging to the subset of sequences $S_k$ based on the cyclical shift value $N_{CS}$ and the third order coefficient value $a_3$. Finally, the client device 300 is configured to transmit the determined cubic polynomial phase sequence $s_i$ as a random access preamble 520 to the network access node 100.

Figure 4:
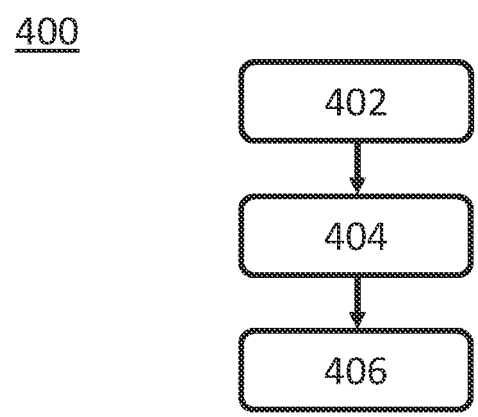
FIG. 4 shows a method according to an example of the application.

FIG. 4 shows a flow chart of a corresponding method 400 which may be executed in a client device 300, such as the one shown in FIG. 3. The method 400 comprises receiving 402 a control message 510 from a network access node 100, wherein the control message 510 indicates a cyclical shift value $N_{CS}$ and a third order coefficient value $a_3$ of a subset of sequences $S_k$. The method 400 comprises determining 404 a cubic polynomial phase sequence $s_i$ belonging to the subset of sequences $S_k$ based on the cyclical shift value $N_{CS}$ and the third order coefficient value $a_3$. The method 400 comprises transmitting 406 the determined cubic polynomial phase sequence $s_i$ as a random access preamble 520 to the network access node 100.

FIG. 5 shows a wireless communication system 500 according to an embodiment. The wireless communication system 500 comprises in this particular non-limiting example a client device 300 and a network access node 100 configured to operate in the wireless communication system 500. The network access node 100 transmits a control message 510 indicating a cyclical shift value $N_{CS}$ and a third order coefficient value $a_3$ to the client device 300. The cyclical shift value $N_{CS}$ and a third order coefficient value $a_3$ is for a sequence in a subset of sequences, where subset of sequences is associated with a cell 530 served by the network access node 100 and used in a random access procedure. For example, each sequence can be used as a random access preamble in the random access procedure. Upon reception of the control message 510, the client device 300 generates a random access preamble based on the cyclical shift value $N_{CS}$ and the third order coefficient value $a_3$. According to a random access procedure, the client device 300 thereafter transmits the random access preamble 520 as illustrated in FIG. 5.

A random access procedure initiated in a client device 300 generally follows from the reception of a synchronization signal broadcasted by the network access node 100. The synchronization signal comprises cell identification and related system information for generating a PRACH signal valid in the cell 530. Notably, the network access node 100 broadcasts the necessary PRACH parameters for generating the corresponding cell-specific subset of sequences. Each cell has a specific subset of sequences.

Figure 6:
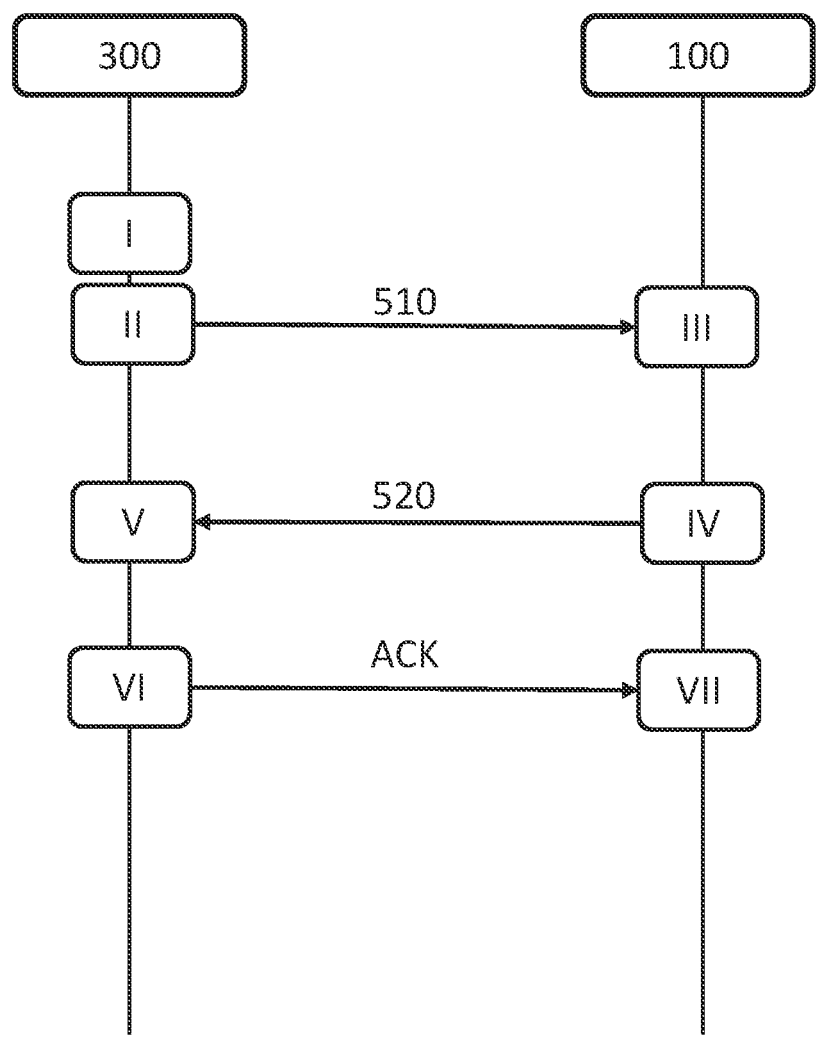
FIG. 6 shows a signalling diagram according to an example of the application.

FIG. 6 shows further aspects of the interworking between the network access node 100 and the client device 300 according to embodiments of the application. In embodiments, such as the one shown in FIG. 6, a subset is defined by at least a unique 3rd degree coefficient $a_3$ and the LCZ based on $N_{CS}$. Therefore, a synchronization signal is broadcasted by the network access node to initiate the corresponding RACH procedure should therefore include at least these parameters in their signalling as shown in FIG. 6.

At step I in FIG. 6, the network access node 100 generates a subset of sequences according to one of the previously mentioned methods for generating the subset of sequences $S_k$.

At step II in FIG. 6, the network access node 100 transmit/broadcasts a control message 510 in the form of a synchronization signal which is received by the client device 300. Usually, the control message 510 is broadcasted in the cell 530. The control message 510 indicates a cyclical shift value $N_{CS}$ and a third order coefficient value $a_3$ associated with the generated subset of sequences.

At step III in FIG. 6, the client device 300 determines a cell specific cubic polynomial phase sequence based on the received control message 510, i.e. based on the indicated cyclical shift value $N_{CS}$ and a third order coefficient value $a_3$. The client device 300 further modulates the determined cubic polynomial phase sequence so as to obtain a random access preamble.

In one embodiment to determine the cubic polynomial phase sequence comprises determine a first order coefficient value $a_1$ based on the third order coefficient value $a_3$ and the cyclical shift value $N_{CS}$ and a second order coefficient value $a_2$ based on the third order coefficient value $a_3$. In one embodiment to determine the cubic polynomial phase sequence comprises determine a first order coefficient value $a_1$ as an arbitrary value and a second order coefficient value $a_2$ based on the third order coefficient value $a_3$ and the cyclical shift value $N_{CS}$. The client device 300 can use any of these two methods for determine the cubic polynomial phase sequence.

At step IV in FIG. 6, the client device 300 transmits the random access preamble in a PRACH according to a random access procedure to the network access node 100.

At step V in FIG. 6, the network access node 100 receives the random access preamble in PRACH, and upon reception of the random access preamble the network access node 100 correlates the received PRACH signal or rather the random access preamble with all possible sequences in the generated subset of sequences so as to identify the client device 300 and to estimate the time-of-arrival of the random access preamble. The estimation of the time-of-arrival is used in time synchronization for transmissions between the network access node 100 and the client device 300.

At step VI in FIG. 6, when the random access preamble has been correctly received and the client device 300 has been identified in the correlation process in step V, the network access node 100 transmits an acknowledgement (ACK) possibly with further synchronization information to the client device 300.

At step VII in FIG. 6, the client device 300 receives the ACK and the further synchronization information, and thereafter continues the synchronization procedure based on the further synchronization information. Mentioned further synchronization information may e.g. relate to random response message, resource block assignment, radio network temporary identifier, etc.

The steps in FIG. 6 may be performed for each cell in the wireless communication system 500. Generally, in network planning each cell is assigned a cell unique subset of sequences with its 3 degree coefficient to be used for random access.

The performance of different embodiments of the application have been compared with conventional solutions that considered low-correlation zone for PRACH detection and the results are given in Table 1 below. As explained above, in many 5G NR scenarios the ratio $\lfloor L/N_{CS} \rfloor$ is often small so that several subsets of ZCZ-ZC sequences needs to be assigned to a single cell, resulting to an inter-cell correlation $\leq \sqrt{L}$. The first and second embodiments of generating the subset of sequences using ZC and Alltop sequences offer subsets already larger than the total set of ZCZ-ZC sequences with the same maximum correlation. One effect of embodiments of the application is to increase the number of available PRACH sequences in a cell without increasing the inter-cell interference, and with a minimum increase of intra-cell interference. With agreed sequence length L=139 in NR, the previously denoted first embodiment (generating the subset of sequences $\mathcal{S}_k$ comprises element-by-element multiplication of a Zadoff-Chu sequence cyclically shifted by a multiple of the cyclical shift value $N_{CS}$ with any cyclically-shifted version of an Alltop sequence) and second embodiments (generating the subset of sequences $\mathcal{S}_k$ comprises element-by-element multiplication of any cyclically shifted version of the Zadoff-Chu sequence with the Alltop sequence cyclically shifted by a multiple of the cyclical shift value $N_{CS}$.) provides a PRAM preamble capacity increase of 139 times for any cell radius i.e. any value of $N_{CS}$. Some results related to different embodiments of the application are shown in Table I below. It is shown that different embodiments of the application enable to construct many subsets of sequences with the same low-correlation zone in a subset than ZC sequences, and limited increased cross correlation compared to ZCZ-ZC sequences. The embodiments in Table I are the previously denoted first embodiment and second embodiment which performance results are given in the last row in Table I. The mentioned first embodiment relates to generating the subset of sequences $\mathcal{S}_k$ by element-by-element multiplication of a Zadoff-Chu sequence cyclically shifted by a multiple of the cyclical shift value $N_{CS}$ with any cyclically-shifted version of an Alltop sequence; and the mentioned second embodiment relates to generating the subset of sequences $\mathcal{S}_k$ by element-by-element multiplication of any cyclically shifted version of the Zadoff-Chu sequence with the Alltop sequence cyclically shifted by a multiple of the cyclical shift value $N_{CS}$. As a result the total number of sequences is greatly increased with embodiments of the application compared to conventional solutions.

TABLE 1

Comparison of the proposed sequence construction with conventional solutions where the maximum cyclic shift in a cell is $N_{CS}$.

| | # sequences per subset | $\Omega(\mathcal{S}_k; N_{CS})$ | # of subsets | $\Omega_{XS}(\mathcal{S}_k, \mathcal{S}_j)$ |
|---|---|---|---|---|
| ZCZ-ZC | $\lfloor L/N_{CS} \rfloor$ | 0 | L − 1 | $\leq \sqrt{L}$ |
| ZC | $(L − 1) \times \lfloor L/N_{CS} \rfloor$ | $\leq \sqrt{L}$ | 1 | |
| First and second embodiments | $L \times \lfloor L/N_{CS} \rfloor$ except ZC subset with: $(L − 1) \times \lfloor L/N_{CS} \rfloor$ | $\leq \sqrt{L}$ | L | $\leq 2\sqrt{L}$ |

In the following section of the disclosure some mathematical definitions and interference measures are defined and explained so as to provide even further understanding of embodiments of the application.

Periodic correlation: A finite sequence is typically treated as the period of an infinite periodic sequence. Accordingly, the periodic correlation between two sequences x[n] and y[n] of length L is defined as $$\theta_{x,y}[\tau] = \sum_{n=0}^{L-1} x[n]y^*[(n+\tau) \bmod L]$$

where $\tau$ is an integer cyclic shift modulo L. This function has the following symmetry property: $\theta_{x,y}[-\tau] = (\theta_{y,x}[\tau])^*$. The zero-lag absolute correlation is by definition the absolute inner product between the two sequences as $\theta_{x,y}[0] = |\langle x,y \rangle|$ where $x = (x[0], \ldots, x[L-1])$ and $y = (y[0], \ldots, y[L-1])$.

Maximum correlation over a delay-zone: Given a set of sequences $\mathcal{S} = \{s_k: 1 \leq k \leq N_{seq}\}$, we define the maximum correlation $\Omega(\mathcal{S}; Z)$ of the set $\mathcal{S}$ over a delay zone of length Z by $$\Omega(\mathcal{S}; Z) = \max\{\Omega_A(\mathcal{S}; Z); \Omega_C(\mathcal{S}; Z)\}$$

where $$\Omega_A(\mathcal{S}; Z) = \max_{\substack{s_k \in \mathcal{S} \\ -Z<\tau<Z; \tau \neq 0}} |\theta_{s_k,s_k}[\tau]|$$

is the maximum out-of-phase auto-correlation in the zone of length Z; and where $$\Omega_C(\mathcal{S}; Z) = \max_{\substack{s_k,s_l \in \mathcal{S}; k \neq l \\ -Z<\tau<Z}} |\theta_{s_k,s_l}[\tau]|$$

is the maximum cross-correlation in the zone of length Z.

Cross-set correlation: Given two sets $\mathcal{S}_1$, $\mathcal{S}_2$ of sequences with same length L, we define the cross-set correlation as $$\Omega_{XS}(\mathcal{S}_1, \mathcal{S}_2) = \max_{\substack{s_k \in \mathcal{S}_1, s_l \in \mathcal{S}_2 \\ -L<\tau<L}} |\theta_{s_k,s_l}[\tau]|.$$

We note that this cross-correlation is defined over all possible shifts $-L<\tau<L$.

Cardinality of a set: The cardinality or size of the set is denoted as $|\mathcal{S}|=N_{seq}$.

ZC sequences: A ZC sequence of odd length L is defined as $$x_u[n] = e^{-j\pi u \frac{n(n+1)}{L}} \quad (1)$$
$$0 \le n \le L-1$$

where the root u is relatively prime to L. We denote the total number of roots by $N_R \le L-1$, and if L is a prime then $1 \le u \le L-1$ are all possible roots. ZC sequences satisfy the following correlation properties: $\Omega_A(x_u; L)=0$ and $\Omega_C(\{x_u, x_{u'}\}; L)=\sqrt{g_{u,u'}L}$ if $u \neq u'$ where $g_{u,u'}$ is the greatest common divisor of $(u-u')$ and $N_{ZC}$. Therefore if L is a prime we have $\Omega_C(\{x_u, x_{u'}\}; L)=\sqrt{L}$. From this construction, one can obtain a set $Z=\{x_u\}_{u=1}^{N_{ZC}-1}$ of L-1 sequences satisfying $\Omega(Z; L) \le \sqrt{L}$.

Minimize intra-cell interference: In a cell, multi-user detection and precise timing estimation can be achieved if the maximum of the periodic correlation over a range of expected shifts is minimized. Namely given the subset of cell-specific PRACH sequences, $\mathcal{S}_k$ for cell k, one should minimize its maximum correlation $\Omega(\mathcal{S}_k; N_{CS})$ where $N_{CS}$ is the maximum possible cyclic shift of a sequence as observed by the receiver due to the delay uncertainty. This depends on the cell radius and for a PRACH signal modulated by DFT-s-OFDM as in LTE and NR is dimensioned as $$N_{CS} \ge \left\lceil \left( \frac{2 \times R}{3 \times 10^8} + \tau_{max} \right) \times L \times \Delta f_{RA} \right\rceil + n_g$$

where R is the cell radius, $\tau_{max}$ is the maximum expected delay spread of the channel, $\Delta f_{RA}$ is the PRACH subcarrier spacing, and $n_g$ are additional guard samples due to the pulse shaping fitter. For simplicity, one often assumes that all cells have the same radius and thus $N_{CS}$ is the same for cell-specific sequence subsets. Nevertheless, all descriptions below can be directly applied to cells with different radius and different $N_{CS}$ values.

Minimize inter-cell interference: Sequences transmitted in different cells may also interfere with each other. Here, the delay uncertainty between sequences from different cell can span all possible values, and thus restricted delay zone cannot be considered in the design. It follows that given two subsets of cell-specific sequences $\mathcal{S}_k$ and $\mathcal{S}_l$, one must also minimize their cross-set correlation $\Omega_{XS}(\mathcal{S}_k, \mathcal{S}_l)$.

The overall sequence design for the set $\mathcal{S}=\cup_k \mathcal{S}_k$ made of a collection of cell-specific subsets $\mathcal{S}_k$ is to minimize inner subset correlation $\Omega(\mathcal{S}_k; N_{CS})$ with delay zone $N_{CS}$, and the cross-subset correlation $\Omega_{XS}(\mathcal{S}_k, \mathcal{S}_l)$. Because PRACH is performed (at least initially) without power control, sequences from different cells are less susceptible to interfere than sequences within the cell. As a result, the "over-the-air" correlation between two cells is decreased and minimizing $\Omega(\mathcal{S}_k; N_{CS})$ is more important than $\Omega_{XS}(\mathcal{S}_k, \mathcal{S}_l)$. This can be reflected in the sequence design by $$\max_x \Omega(\mathcal{S}_k; N_{CS}) \le \min_{k,l} \Omega_{XS}(\mathcal{S}_k, \mathcal{S}_l).$$

Ideally, the auto- and cross-correlations of the cell-specific sequences should be set to zero, i.e. $\Omega(\mathcal{S}_k; N_{CS})=0$. This leads to the consideration of ZCZ sequences. One way to achieve ZCZ is to take specific cyclically-shifted version of constant amplitude zero autocorrelation (CAZAC) sequences. ZC sequence is a well-known example of a CAZAC sequence.

In 3GPP LTE and NR, the set of PRACH sequences is obtained from orthogonal cyclically-shifted ZC sequences. Shifts are done with a constant value $0<N_{CS} \le L$ such that it enables unambiguous detection with timing uncertainty $|\tau|<N_{CS}$. Sequences are generated as $$x_{u,v}[n]=x_u[n+C_v], 0 \le n \le L-1 \quad (2)$$

where $C_v=vN_{CS}$ with $0 \le v \le N_{SPR}-1$ and $N_{SPR}=\lfloor L/N_{CS} \rfloor$, and $x_u[n]$ is a ZC sequence with root u as defined in (1).

This produces (L-1) subsets $Z_{u,N_{CS}}=\{x_{u,v}\}_{v=0}^{N_{SPR}-P}$ of $\lfloor L/N_{CS} \rfloor$ sequences satisfying $\Omega(Z_{u,N_{CS}}; N_{CS})=0$. The cross-correlation between these subsets is $\Omega_{XS}(Z_{u,N_{CS}}, Z_{u',N_{CS}}) \le \sqrt{L}$. The subset structure allows to allocate different cells with different orthogonal subsets $Z_{u,N_{CS}}$ so that the correlation inside a cell is zero while the sequences between two cells are mutually unbiased. However, if a single orthogonal subset size $N_{SPR}$ is too small, unions of orthogonal subsets needs to be used in a cell. This will become more frequent for new PRACH formats in 3GPP NR due to the recently introduced high subcarrier spacing. As a result, the intra-cell cross-correlation is increased to $\sqrt{L}$ while at the same time less cell can be supported with a unique set of sequences. Overall, the set $Z_{N_{CS}}=\cup_{u=1}^{L-1} Z_{u,N_{CS}}$ is a collection of $(L-1) \times \lfloor L/N_{CS} \rfloor$ sequences with $\Omega(Z_{N_{CS}}; N_{CS}) \le \sqrt{L}$.

The ZC sequences are quadratic (second-degree) polynomial phase sequences that achieves a cross-correlation of $\sqrt{L}$. From the Carlitz-Uchiyama bound, the cross-correlation between general polynomial phase sequences of degree $r>0$ is bounded by $(r-1)\sqrt{L}$. An enlarged structured construction with higher degree polynomial phase would inevitably introduces inner product of the order of $2\sqrt{L}$.

A top's cubic phase sequences: these sequences are defined for every prime length $L \ge 5$ as $$a_\lambda[n] = e^{-j2\pi \frac{n^3 + \lambda n}{L}}$$

$$0 \leq n \leq L - 1.$$

with $0 \leq \lambda \leq L-1$. This produces a small set $\mathcal{A} = \{a_\lambda\}_{\lambda=0}^{L-1}$ of L sequences with $\Omega(\mathcal{A}; L) \leq \sqrt{L}$.

MUB set from Alltop sequences: It can be shown that a complete set of MUBs can be constructed from all cyclic shifts of the Alltop's cubic phase sequences and the canonical vector basis of $\mathbb{R}^L$ which forms an identity matrix. In this case, the set of sequences is treated as a set of vectors whose performance is evaluated from the maximum zero-lag correlation (absolute inner product) without further consideration for the full periodic correlation properties. The sequences are defined as $$g_{w,\lambda}[n] = e^{-j2\pi \frac{(n-w)^3 + \lambda n}{L}} \quad (3)$$

$$0 \leq n \leq L - 1.$$

where $0 \leq w \leq L-1$. The sequences $g_{w,\lambda}[n]$ are not exactly the cyclic-shift $a_\lambda[n-w]$ of the original sequences but differ only by constant phases which do not impact the cross-correlation properties of the set.

Two sequences with different linear coefficient $g_{w,\lambda}[n]$ and $g_{w,\lambda'}[n]$ are orthogonal, while two different shifted-version of the same sequence $g_{w,\lambda}[n]$ and $g_{w',\lambda}[n]$ have a zero-lag cross-correlation equal to $\sqrt{L}$.

The set $\mathcal{G} = \{g_{w,\lambda}\}_{\lambda,w=0}^{L-1}$ is of size $L^2$, i.e. only slightly larger than the set of all cyclically-shifted ZC sequences $Z_1$. As only zero-lag correlation is considered in this construction, the full set $\mathcal{G}$ reaches the maximum correlation $\Omega(\mathcal{G}; N_{CS}) = L$ for any delay zone $N_{CS} \geq 1$, and as such would not enable unambiguous detection in PRACH.

Quasi-orthogonal supersets: Enlarged sets of sequences are constructed by unions of quasi-orthogonal subsets of sequences $\mathcal{S} \cup_h \mathcal{T}$ where each subset $\mathcal{T}$ is obtained by multiplying every sequence in $\mathcal{S}$ elements-by-elements with different sequence covers. Therein, the extended sequence set is treated also as a set of vectors, i.e. the cross-correlation analysis is limited to the zero-lag ($\tau=0$) case. In this context, the full set of ZC sequences is the set of quadratic sequences which is itself a subset of polynomial phase sequences of degree less or equal to two:

$$p_{a_1,a_2,a_3}[n] = e^{-j2\pi \frac{a_3 n^3 + a_2 n^2 + a_1 n}{L}}$$

$$0 \leq n \leq L - 1$$

where $0 \leq a_1, a_2 \leq L-1$. This can be extended with the polynomial phase sequences with higher degree, of which e.g. polynomial phase sequences of degree less or equal to three $$p_{a_1,a_2}[n] = e^{-j2\pi \frac{a_2 n^2 + a_1 n}{L}}$$

$$0 \leq n \leq L - 1$$

with $0 \leq a_1, a_2, a_3 \leq L-1$. This construction provides a complete enumeration of all possible polynomial phase sequences with degree less or equal to three, however, many sequences are then cyclic-shifted versions of each other, as $p_{a_1,a_2,a_3}[n+\tau] = p_{a'_1,a'_2,a_3}[n]$ with $a'_2 = 3a_3\tau + a_2$ and $a'_1 = 3a_3\tau^2 + 2a_2\tau + a_1$, and thus do not allow an easy restriction to subsets with LCZ for unambiguous detection in PRACH. Additionally, we remark that the L sequences $\{p_{a_1,0,0}[n]\}_{a_1=0}^{L-1}$ have all a constant maximum periodic autocorrelation and cannot either be used for accurate PRACH timing estimation.

The client device 300 herein, may be denoted as a user device, a User Equipment (UE), a mobile station, an internet of things (IoT) device, a sensor device, a wireless terminal and/or a mobile terminal, is enabled to communicate wirelessly in a wireless communication system, sometimes also referred to as a cellular radio system. The UEs may further be referred to as mobile telephones, cellular telephones, computer tablets or laptops with wireless capability. The UEs in this context may be, for example, portable, pocket-storable, hand-held, computer-comprised, or vehicle-mounted mobile devices, enabled to communicate voice and/or data, via the radio access network, with another entity, such as another receiver or a server. The LTE can be a Station (STA), which is any device that contains an IEEE 802.11-conformant Media Access Control (MAC) and Physical Layer (PHY) interface to the Wireless Medium (WM). The UE may also be configured for communication in 3GPP related LTE and LTE-Advanced, in WiMAX and its evolution, and in fifth generation wireless technologies, such as New Radio.

The network access node 100 herein may also be denoted as a radio network access node, an access network access node, an access point, or a base station, e.g. a Radio Base Station (RBS), which in some networks may be referred to as transmitter, "gNB", "gNodeB", "eNB", "eNodeB", "NodeB" or "B node", depending on the technology and terminology used. The radio network access nodes may be of different classes such as e.g. macro eNodeB, home eNodeB or pico base station, based on transmission power and thereby also cell size. The radio network access node can be a Station (STA), which is any device that contains an IEEE 802.11-conforrnant Media Access Control (MAC) and Physical Layer (PHY) interface to the Wireless Medium (WM). The radio network access node may also be a base station corresponding to the fifth generation (5G) wireless systems.

Furthermore, any method according to embodiments of the application may be implemented in a computer program, having code means, which when run by processing means causes the processing means to execute the steps of the method. The computer program is included in a computer readable medium of a computer program product. The computer readable medium may comprise essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that embodiments of the client device 300 and the network access node 100 comprises the necessary communication capabilities in the form of e.g., functions, means, units, elements, etc., for performing the solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the solution.

Especially, the processor(s) of the client device 300 and the network access node 100 may comprise, e.g., one or more instances of a Central Processing Unit (CPU), a processing unit, a processing circuit, a processor, an Application Specific Integrated Circuit (ASIC), microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the application is not limited to the embodiments described above, but also relates to and incorporates all embodiments within the scope of the appended independent claims.

The invention claimed is:

1. An apparatus, comprising:
    at least one processor;
    a memory coupled to the at least one processor, wherein the memory stores a program to be executed by the at least one processor, and wherein the program comprises instructions which, when executed by the at least one processor, instruct the at least one processor to perform operations comprising:
        generating a subset of sequences ($\mathcal{S}_k$) belonging to a set of sequences ($\mathcal{S}$), wherein:
            the subset of sequences ($\mathcal{S}_k$) comprises a plurality of cubic phase polynomial sequences ($s_i, s_j$) of length L with a third order coefficient value $a_3$;
            an auto-correlation for a sequence ($s_i$) in the generated subset of sequences with a cyclically shifted version of itself ($s'_i$) is less than or equal to $\sqrt{L}$ when the cyclically shifted version ($s'_i$) is cyclically shifted less than a cyclical shift value $N_{CS}$;
            a cross-correlation between a first sequence ($s_i$) and a second sequence ($s_j$) in the generated subset of sequences ($\mathcal{S}_k$) is less than or equal to $\sqrt{L}$; and
            a cross-correlation between the first sequence ($s_i$) and the second sequence ($s_j$) in the generated subset of sequences ($\mathcal{S}_k$) is less than or equal to $\sqrt{L}$ when one of the first sequence ($s_i$) and the second sequence ($s_j$) is cyclically shifted less than the cyclical shift value $N_{CS}$; and
        transmitting a control message to a client device, wherein the control message indicates the cyclical shift value $N_{CS}$ and the third order coefficient value $a_3$.

2. The apparatus according to claim 1, wherein a cross-correlation between two sequences belonging to two different subsets of sequences is less than or equal to $2\sqrt{L}$.

3. The apparatus according to claim 1, wherein third order coefficients of sequences belonging to different subsets of sequences are different.

4. The apparatus according to claim 1, wherein each sequence belonging to the set of sequences ($\mathcal{S}$) has a non-zero third order coefficient value $a_3$.

5. The apparatus according to claim 1, wherein generating the subset of sequences ($\mathcal{S}_k$) comprises:
    element-by-element multiplication of a Zadoff-Chu sequence with an Alltop sequence.

6. The apparatus according to claim 5, wherein generating the subset of sequences ($\mathcal{S}_k$) comprises:
    element-by-element multiplication of the Zadoff-Chu sequence cyclically shifted by a multiple of the cyclical shift value $N_{CS}$ with any cyclically-shifted version of the Alltop sequence.

7. The apparatus according to claim 5, wherein generating the subset of sequences ($\mathcal{S}_k$) comprises:
    element-by-element multiplication of any cyclically shifted version of the Zadoff-Chu sequence with the Alltop sequence cyclically shifted by a multiple of the cyclical shift value $N_{CS}$.

8. The apparatus according to claim 1, wherein a second order coefficient value $a_2$ is a product of the third order coefficient value $a_3$ and the cyclical shift value $N_{CS}$.

9. An apparatus, comprising:
    at least one processor;
    a memory coupled to the at least one processor, wherein the memory stores a program to be executed by the at least one processor, and wherein the program comprises instructions which, when executed by the at least one processor, instruct the at least one processor to perform operations comprising:
        receiving a control message from a network access node, wherein the control message indicates a cyclical shift value $N_{CS}$ and a third order coefficient value $a_3$ of a subset of sequences ($\mathcal{S}_k$);
        determining a cubic polynomial phase sequence ($s_i$) belonging to the subset of sequences ($\mathcal{S}_k$) based on the cyclical shift value $N_{CS}$ and the third order coefficient value $a_3$;
        transmitting the determined cubic polynomial phase sequence ($s_i$) as a random access preamble to the network access node.

10. The apparatus according to claim 9, wherein determining the cubic polynomial phase sequence comprises:
    determining a first order coefficient value $a_1$ based on the third order coefficient value $a_3$ and the cyclical shift value $N_{CS}$; and
    determining a second order coefficient value $a_2$ based on the third order coefficient value $a_3$.

11. The apparatus according to claim 10, wherein determining the cubic polynomial phase sequence comprises:
    determining a first order coefficient value $a_1$ as an arbitrary value; and
    determining a second order coefficient value $a_2$ based on the third order coefficient value $a_3$ and the cyclical shift value $N_{CS}$.

12. The apparatus according to claim 9, wherein the subset of sequences ($\mathcal{S}_k$) is a subset belonging to a set of sequences ($\mathcal{S}$), wherein:
    the subset of sequences ($\mathcal{S}_k$) comprises a plurality of cubic phase polynomial sequences ($s_i, s_j, \ldots$) of length L with a third order coefficient value $a_3$;
    an auto-correlation for a sequence ($s_i$) in the generated subset of sequences with a cyclically shifted version of itself ($s'_i$) is less than or equal to $\sqrt{L}$ when the cyclically shifted version ($s'_i$) is cyclically shifted less than a cyclical shift value $N_{CS}$;
    a cross-correlation between a first sequence ($s_i$) and a second sequence ($s_j$) in the generated subset of sequences ($\mathcal{S}_k$) is less than or equal to $\sqrt{L}$; and
    a cross-correlation between the first sequence ($\mathcal{S}_k$) and the second sequence ($s_j$) in the generated subset of sequences ($\mathcal{S}_k$) is less than or equal to $\sqrt{L}$ when one of the first sequence ($s_i$) and the second sequence ($s_j$) is cyclically shifted less than the cyclical shift value $N_{CS}$.

13. A method, comprising:
  generating a subset of sequences ($\mathcal{S}_k$) belonging to a set of sequences ($\mathcal{S}$), wherein:
    the subset of sequences ($\mathcal{S}_k$) comprises a plurality of cubic phase polynomial sequences ($s_i$, $s_j$) of length L with a third order coefficient value $a_3$;
    an auto-correlation for a sequence ($s_i$) in the generated subset of sequences with a cyclically shifted version of itself ($s'_i$) is less than or equal to $\sqrt{L}$ when the cyclically shifted version ($s'_i$) is cyclically shifted less than a cyclical shift value $N_{CS}$;
    a cross-correlation between a first sequence ($s_i$) and a second sequence ($s_j$) in the generated subset of sequences ($\mathcal{S}_k$) is less than or equal to $\sqrt{L}$; and
    a cross-correlation between the first sequence ($s_i$) and the second sequence ($s_j$) in the generated subset of sequences ($\mathcal{S}_k$) is less than or equal to $\sqrt{L}$ when one of the first sequence ($s_i$) and the second sequence ($s_j$) is cyclically shifted less than the cyclical shift value $N_{CS}$; and
  transmitting a control message to a client device, wherein the control message indicates the cyclical shift value $N_{CS}$ and the third order coefficient value $a_3$.

14. The method according to claim 13, wherein a cross-correlation between two sequences belonging to two different subsets of sequences is less than or equal to $2\sqrt{L}$.

15. The method according to claim 13, wherein third order coefficients of sequences belonging to different subsets of sequences are different.

16. The method according to claim 13, wherein each sequence belonging to the set of sequences ($\mathcal{S}$) has a non-zero third order coefficient value $a_3$.

17. The method according to claim 13, wherein generating the subset of sequences ($\mathcal{S}_k$) comprises:
  element-by-element multiplication of a Zadoff-Chu sequence with an Alltop sequence.

18. The method according to claim 17, wherein generating the subset of sequences ($\mathcal{S}_k$) comprises:
  element-by-element multiplication of the Zadoff-Chu sequence cyclically shifted by a multiple of the cyclical shift value $N_{CS}$ with any cyclically-shifted version of the Alltop sequence.

19. The method according to claim 17, wherein generating the subset of sequences ($\mathcal{S}_k$) comprises:
  element-by-element multiplication of any cyclically shifted version of the Zadoff-Chu sequence with the Alltop sequence cyclically shifted by a multiple of the cyclical shift value $N_{CS}$.

20. The method according to claim 13, wherein a second order coefficient value $a_2$ is a product of the third order coefficient value $a_3$ times the cyclical shift value $N_{CS}$.

* * * * *

UNITED STATES PATENT AND TRADEMARK OFFICE
CERTIFICATE OF CORRECTION

PATENT NO. : 11,310,837 B2
APPLICATION NO. : 16/950159
DATED : April 19, 2022
INVENTOR(S) : Renaud-Alexandre Pitaval and Branislav M. Popovic Page 1 of 1

It is certified that error appears in the above-identified patent and that said Letters Patent is hereby corrected as shown below:

In the Claims

In Column 20 Line 63, In Claim 12, delete "$(\mathcal{S}_k)$" and insert -- $(s_i)$ --.

Signed and Sealed this
Sixteenth Day of August, 2022

Katherine Kelly Vidal
*Director of the United States Patent and Trademark Office*